United States Patent
Huijsing

(10) Patent No.: US 11,975,838 B2
(45) Date of Patent: May 7, 2024

(54) AIRCRAFT INSERTS HAVING SURFACE INTEGRATED ANTENNAS AND/OR FILTERS

(71) Applicant: B/E AEROSPACE, INC., Winston Salem, NC (US)

(72) Inventor: Hans Huijsing, Ijsselstein (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 646 days.

(21) Appl. No.: 17/131,707

(22) Filed: Dec. 22, 2020

(65) Prior Publication Data
US 2022/0194591 A1    Jun. 23, 2022

(51) Int. Cl.
*B64D 11/04* (2006.01)
*B64D 11/00* (2006.01)
*H01Q 1/52* (2006.01)

(52) U.S. Cl.
CPC .......... *B64D 11/04* (2013.01); *B64D 11/0015* (2013.01); *H01Q 1/526* (2013.01)

(58) Field of Classification Search
None
See application file for complete search history.

(56) References Cited

U.S. PATENT DOCUMENTS

| | | | | |
|---|---|---|---|---|
| 5,982,339 A * | 11/1999 | Lalezari | ............. | H01Q 15/0013 343/705 |
| 6,855,883 B1 * | 2/2005 | Matsui | ................. | H05K 9/009 174/393 |
| 9,876,280 B1 * | 1/2018 | Pillans | ............... | H01Q 15/0026 |
| 10,745,938 B2 | 8/2020 | Vandewall et al. | | |
| 10,798,549 B1 | 10/2020 | Reed et al. | | |
| 2008/0011510 A1 * | 1/2008 | Tang | ..................... | H05K 9/0016 174/350 |
| 2011/0220527 A1 | 9/2011 | Baatz | | |
| 2014/0014436 A1 * | 1/2014 | Nguyen | ................ | F24F 13/082 181/210 |

(Continued)

FOREIGN PATENT DOCUMENTS

| | | |
|---|---|---|
| CN | 102868021 B | 9/2015 |
| JP | 2022011526 A  * | 1/2022 ........... G01S 13/931 |

OTHER PUBLICATIONS

"Fiberglass—Types, Properties, and Applications Across Industries", captured at Wayback Machine on Dec. 5, 2020, Phepls Gaskets website, https://www.phelpsgaskets.com/blog/fiberglass--types-properties-and-applications-across-industries (Year: 2020).*

(Continued)

*Primary Examiner* — Ab Salam Alkassim, Jr.
*Assistant Examiner* — Anh N Ho
(74) *Attorney, Agent, or Firm* — SNELL & WILMER L.L.P.

(57) ABSTRACT

A filter component for an aircraft insert can include a non-conductive body having an outer surface and an inner surface. The inner surface can be configured to be hidden from view when installed on the insert. The filter component can include a surface filter disposed on the inner surface such that when the non-conductive body is installed on the insert the surface filter is not visible. The surface filter can be configured to filter out one or more predetermined filter frequencies.

17 Claims, 4 Drawing Sheets

(56) References Cited

U.S. PATENT DOCUMENTS

2023/0223696 A1* 7/2023 Nakamura ........... H01Q 9/0407
                                                                               343/848

OTHER PUBLICATIONS

"Malware Escapes from Faraday Cages and Air-Gapped Computers", 2018, CBG website, https://cyber.bgu.ac.il/media/malware-escapes-from-faraday-cages-and-air-gapped-computers/ (Year: 2018).*
Anonymous: "Radome-Wikipedia", URL: https://en.wikipedia.org/w/index.php?title=Radome&oldid=973279741, retrieved on Apr. 5, 2022, second paragraph.
Anonymous: "Custom Plastic Radomes/Thermoforming/Blow Molding/Injection Molding/Universal Plastics", URL: https://web.archive.org/web/20200425041652/https://www.universalplastics.com/custom-plastic-radomes, retrieved on Apr. 5, 2022, p. 1.
Extended European Search Report issued, of the European Patent Office, dated May 13, 2022, in corresponding European Patent Application No. 21217031.0.

* cited by examiner

| Limits for Radiated Emission | | | | | | | |
|---|---|---|---|---|---|---|---|
| Freq. [MHz] | Level [dBμV/m] | Freq. [MHz] | Level [dBμV/m] | Freq. [MHz] | Level [dBμV/m] | Freq. [MHz] | Level [dBμV/m] |
| 2 | 27.0[1] | 320 | 39.7 | 1215 | 48.9[2] | 5100 | 43.9 |
| 25 | 22.0[1] | 320 | 24.7 | 1525 | 50.0[2] | 5100 | 58.9 |
| 100 | 31.6[1] | 340 | 25.1 | 1525 | 35.5[2] | 6000 | 60.0 |
| 108 | 32.1[2] | 340 | 40.1 | 1680 | 36.2[2] | - | - |
| 108 | 12.0[2] | 960 | 47.3 | 1680 | 51.2[2] | - | - |
| 152 | 14.0[2] | 960 | 32.3 | 5020 | 58.8[2] | - | - |
| 152 | 34.5[2] | 1215 | 34.0 | 5020 | 43.8[2] | - | - |

AIRCRAFT INSERTS HAVING SURFACE INTEGRATED ANTENNAS AND/OR FILTERS

FIELD

This disclosure relates to aircraft inserts, more specifically to inserts having integrated antennas and/or EM filters.

BACKGROUND

Wireless aircraft inserts require an antenna, for example. There are numerous antennas that could be considered such as PCB, stamped metal, ceramic chip, or stub antennas. The downside of these antennas is that they are either placed inside the equipment (thus less reception) or are clearly visible when installed on the outside (affecting the aesthetics). When multiple frequencies are applicable, multiple antennas may be required.

Such conventional methods and systems have generally been considered satisfactory for their intended purpose. However, there is still a need in the art for improved aircraft inserts. The present disclosure provides a solution for this need.

SUMMARY

In accordance with at least one aspect of this disclosure, an antenna component for an aircraft insert can include a non-conductive body having an outer surface and an inner surface. The inner surface can be configured to be hidden from view when installed on the insert. The antenna component can include a surface antenna assembly disposed on the inner surface such that when the non-conductive body is installed on the insert the surface antenna is not visible. The surface antenna assembly can be configured (e.g., dimensioned) to receive one or more predetermined frequencies. The non-conductive body can be configured to pass at least the one or more predetermined frequencies.

The non-conductive body can be plastic, for example. Any other suitable non-conductive material is contemplated herein.

The surface antenna assembly can include a conductive trace antenna disposed on the inner surface of the non-conductive body and configured to act as an antenna for the one or more predetermined frequencies. The surface antenna assembly can include an electrical connector mounted to the inner surface of the non-conductive body in electrical communication with each leg of the conductive trace antenna to provide a connection point for one or more electrical connectors. The electrical connector can be a pin connector, for example. Any other suitable connection type (e.g., to transmit electrical signals to/from a receiver/transmitter) is contemplated herein.

The non-conductive body can be a faceplate for an aircraft appliance (e.g., an oven). For example, in certain embodiments, the non-conductive body can define a grill and a window for viewing an electronic display. The outer surface can include one or more touch buttons for operating the appliance. Any other suitable features are contemplated herein.

The antenna assembly can also include a conductive trace filter defined on the inner surface and surrounding one or more conductive trace antennas to provide filtering (e.g., to block specific frequencies or frequency ranges). The conductive trace filter can define a cage or grid shape, for example.

In accordance with at least one aspect of this disclosure, an aircraft insert can include any suitable embodiment of an antenna component as disclosed herein, e.g., as described above. In certain embodiments, the aircraft insert can be an oven configured to communicate wirelessly over an aircraft network. Any other suitable aircraft appliance is contemplated herein.

In accordance with at least one aspect of this disclosure, a filter component for an aircraft insert can include a non-conductive body having an outer surface and an inner surface. The inner surface can be configured to be hidden from view when installed on the insert. The filter component can include a surface filter disposed on the inner surface such that when the non-conductive body is installed on the insert the surface filter is not visible. The surface filter can be configured to filter out one or more predetermined filter frequencies.

The non-conductive body can be plastic, for example. Any other suitable non-conductive material is contemplated herein. In certain embodiments, the surface filter can be or include a conductive trace filter disposed on the inner surface of the non-conductive body and configured to act as frequency filter for the one or more predetermined filter frequencies.

The non-conductive body can be a faceplate for an aircraft appliance, for example. In certain embodiments, the non-conductive body can define a grill and a window for viewing an electronic display, for example. Any other suitable features are contemplated herein.

In certain embodiments, the conductive trace filter can cover a portion of the grill to define an uncovered portion to pass one or more communication frequencies. The conductive trace filter can be formed to conform with one or more inner surface shapes, for example.

In certain embodiments, the conductive trace filter can define a cage or grid shape to act as a faraday cage. Gaps in the cage or grid shape can be sized to filter frequencies having wavelengths larger than the gaps. Any other suitable shapes and/or filter features are contemplated herein.

The surface filter can be configured pass one or more predetermined communication frequencies while filtering the one or more predetermined frequencies to aircraft device emissions limits. Any suitable frequencies for filtering (e.g., to be under predetermined magnitude limits for aircraft standards) are contemplated herein.

In accordance with at least one aspect of this disclosure, an aircraft insert can include any suitable embodiment of a filter component for the aircraft insert disclosed herein, e.g., as described above. In certain embodiments, the aircraft insert can be an oven configured to communicate wirelessly over an aircraft network. Any other suitable aircraft appliance is contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
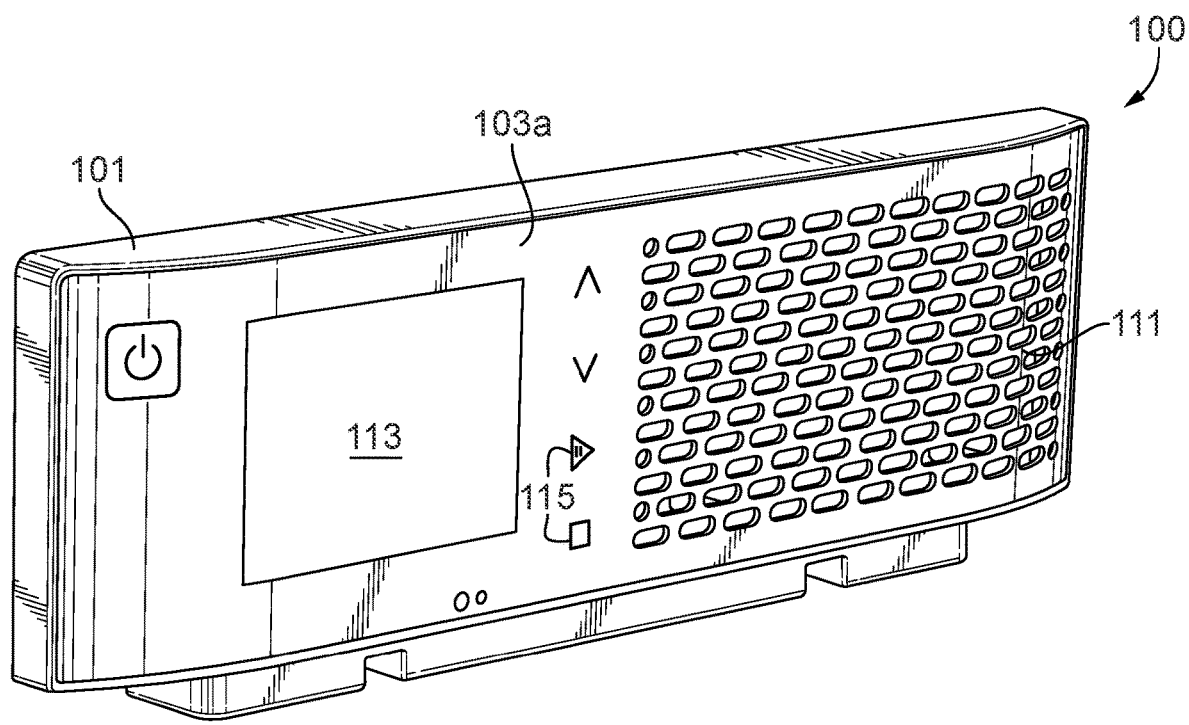
FIG. 1 is a perspective view of an embodiment of an antenna component for an aircraft insert in accordance with this disclosure, showing the outer surface of a non-conductive body.

Reference will now be made to the drawings wherein like reference numerals identify similar structural features or aspects of the subject disclosure. For purposes of explanation and illustration, and not limitation, an illustrative view of an embodiment of an antenna component in accordance with the disclosure is shown in FIG. 1 and is designated generally by reference character 100. An embodiment of a filter component in accordance with the disclosure is shown in FIG. 3 and is designated generally by reference character 300. Other embodiments and/or aspects of this disclosure are shown in FIGS. 2 and 4-6. Certain embodiments described herein can be used to enable aircraft inserts with wireless communication.

Figure 2:
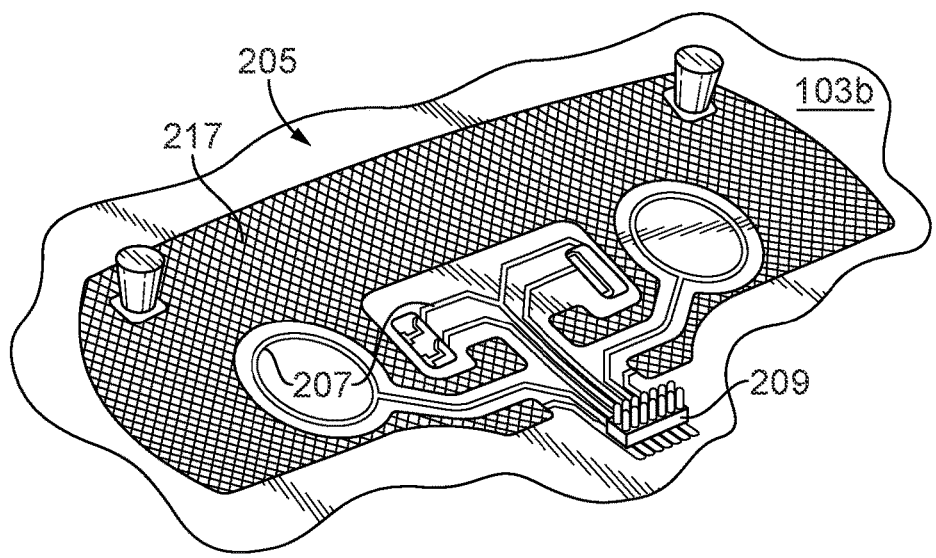
FIG. 2 is a perspective view of a portion of the inner surface of the embodiment of FIG. 1, showing an embodiment of a surface antenna assembly.
Figure 3:
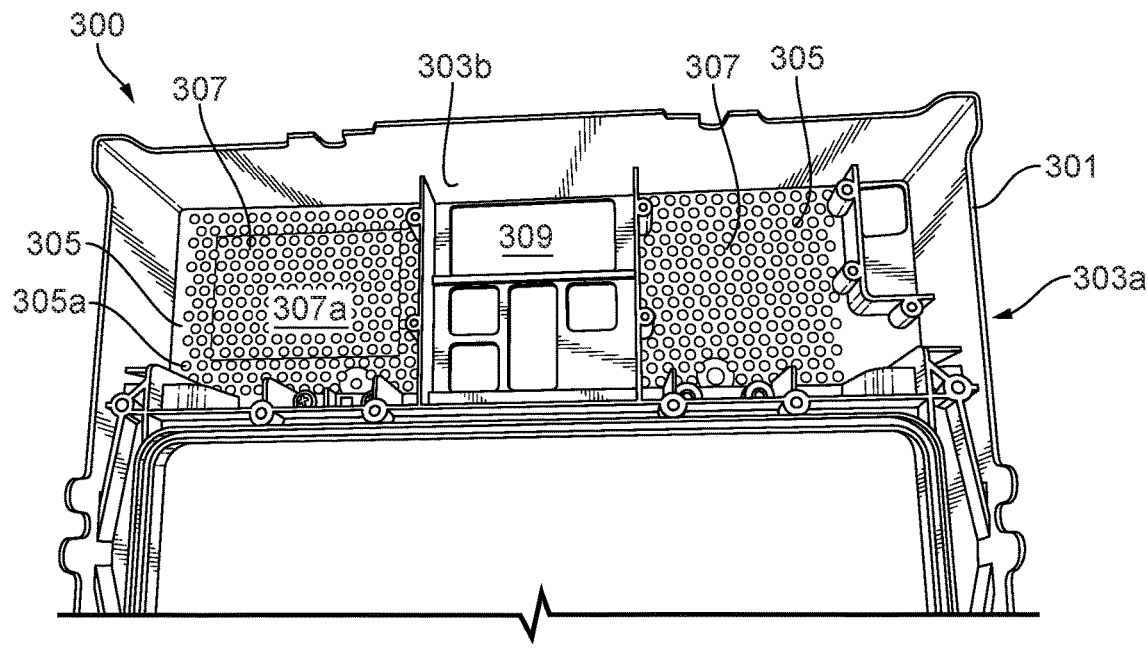
FIG. 3 is a rear perspective view of an embodiment of a filter component for an aircraft insert in accordance with this disclosure, showing an inner surface having an embodiment of a surface filter disposed thereon.

Referring to FIGS. 1 and 2, in accordance with at least one aspect of this disclosure, an antenna component 100 for an aircraft insert (e.g., an insertable aircraft oven or any other suitable appliance) can include a non-conductive body 101 having an outer surface 103a and an inner surface 103b (e.g., the opposite side of the non-conductive body 101 from the outer surface 103a). The inner surface 103b can be configured to be hidden from view when installed on the insert.

As shown in FIG. 2, the antenna component 100 can include a surface antenna assembly 205 disposed on the inner surface 103b such that when the non-conductive body 101 is installed on the insert, the surface antenna assembly 205 is not visible. The surface antenna assembly 205 can be configured (e.g., dimensioned) to receive one or more predetermined frequencies (e.g., frequencies used for WIFI, Bluetooth, RFID, or any other suitable communication frequency). The non-conductive body 101 can be configured to pass at least the one or more predetermined frequencies (e.g., by virtue of being non-conductive or otherwise not being an EM shield or filter for the one or more predetermined frequencies).

The non-conductive body 101 can be plastic, for example. Any other suitable non-conductive material is contemplated herein.

The surface antenna assembly 205 can include a conductive trace antenna 207 disposed on the inner surface 103b of the non-conductive body 101 and configured to act as an antenna for the one or more predetermined frequencies. The conductive trace antenna 207 can include any suitable number of legs (e.g., multiple legs as shown).

The conductive trace antenna 207 can be printed on to the inner surface 103b for example, or otherwise be manufactured onto the inner surface 103b. The conductive trace as disclosed herein can form a very thin layer where placed, approximating a 2-dimensional surface. For example, the conductive trace can be a deposited metal layer. Any suitable number of conductive trace antennas 207 of any suitable shapes and/or sizes appreciated by those having ordinary skill in the art to perform the desired function are contemplated herein.

The surface antenna assembly 205 can include an electrical connector 209 mounted to the inner surface 103b of the non-conductive body 101 in electrical communication with each leg of the conductive trace antenna 107 to provide a connection point for one or more other electrical connectors 209. The electrical connector 209 can be a pin connector, e.g., as shown, for example. Any other suitable connection type (e.g., to transmit electrical signals to/from a receiver/transmitter) is contemplated herein.

The non-conductive body 101 can be a faceplate for an aircraft appliance (e.g., an oven). For example, in certain embodiments, the non-conductive body 101 can define a grill 111 and a window 113 for viewing an electronic display (of the insert). The outer surface 103a can include one or more touch buttons 115 for operating the appliance. In certain embodiments, the conductive material can also be used to create capacitive touch buttons, through the non-conductive material. Any other suitable features are contemplated herein.

The surface antenna assembly 205 can also include a conductive trace filter 217 defined on the inner surface 103b and surrounding one or more conductive trace antennas 207 to provide filtering (e.g., EMI protection), for example (e.g., to block specific frequencies or frequency ranges). The conductive trace filter 217 can define a cage or grid shape (e.g., as shown), for example. Any other suitable shapes are contemplated herein (e.g., to provide a faraday cage).

In accordance with at least one aspect of this disclosure, an aircraft insert can include any suitable embodiment of an antenna component as disclosed herein, e.g., component 100 as described above. In certain embodiments, the aircraft insert can be an oven configured to communicate wirelessly over an aircraft network. Any other suitable aircraft appliance is contemplated herein.

In accordance with at least one aspect of this disclosure, referring to FIG. 3, a filter component 300 for an aircraft insert (e.g., an oven, a stove, a coffee maker) can include a non-conductive body 301 having an outer surface 303a and an inner surface 303b. The inner surface 303b can be configured to be hidden from view when installed on the insert. The filter component 300 can include a surface filter 305 disposed on the inner surface 303b such that when the non-conductive body 301 is installed on the insert, the surface filter is not visible 305. The surface filter 305 can be configured to filter out one or more predetermined filter frequencies (e.g., one or more frequencies emitted by the insert that interferes with one or more other aircraft electronics).

The non-conductive body 301 can be plastic, for example. Any other suitable non-conductive material is contemplated herein. In certain embodiments, the surface filter 305 can be or include a conductive trace filter (e.g., as shown) disposed on the inner surface 303b of the non-conductive body 301 and configured to act as frequency filter for the one or more predetermined filter frequencies.

The conductive trace filter 305 can be printed on to the inner surface 303b for example, or otherwise be manufactured onto the inner surface 303b. The conductive trace as disclosed herein can form a very thin layer where placed, approximating a 2-dimensional surface. For example, the conductive trace can be a deposited metal layer.

The non-conductive body 301 can be a faceplate for an aircraft appliance (e.g., an oven), for example. In certain embodiments, the non-conductive body 301 can define a grill 307 and a window 309 for viewing an electronic display, for example. Any other suitable features are contemplated herein.

In certain embodiments, the conductive trace filter 305 can cover a portion of the grill 307 to define an uncovered portion 307a (e.g., as shown) to pass one or more communication frequencies (e.g., at a specific location of the component 300 to allow an antenna of the insert to receive and/or transmit desired frequencies through the uncovered portion 307a). In certain embodiments, there may be no uncovered portion, and the conductive trace filter 305 can cover any suitable portion (e.g., the entirety of) the inner surface 303b (e.g., with a suitable shape to permit communication frequencies but block EMI frequencies). The conductive trace filter 305 can be formed to conform with one or more inner surface shapes (e.g., the grill 307, for example).

In certain embodiments, for example, the conductive trace filter 305 can define a cage or grid shape to act as a faraday cage (e.g., following the shape of a grill 307, or positioned elsewhere e.g., on a flat surface). Gaps 305a in the cage or grid shape (e.g., and/or holes forming the same shape in the grill 307) can be sized to filter frequencies having wavelengths larger than the gaps 305a. The uncovered portion 307a can be sized and shaped to pass wavelengths equal to or smaller than the diameter or longest dimension of the uncovered portion 307a. Any other suitable shapes and/or filter features are contemplated herein.

Figure 4:
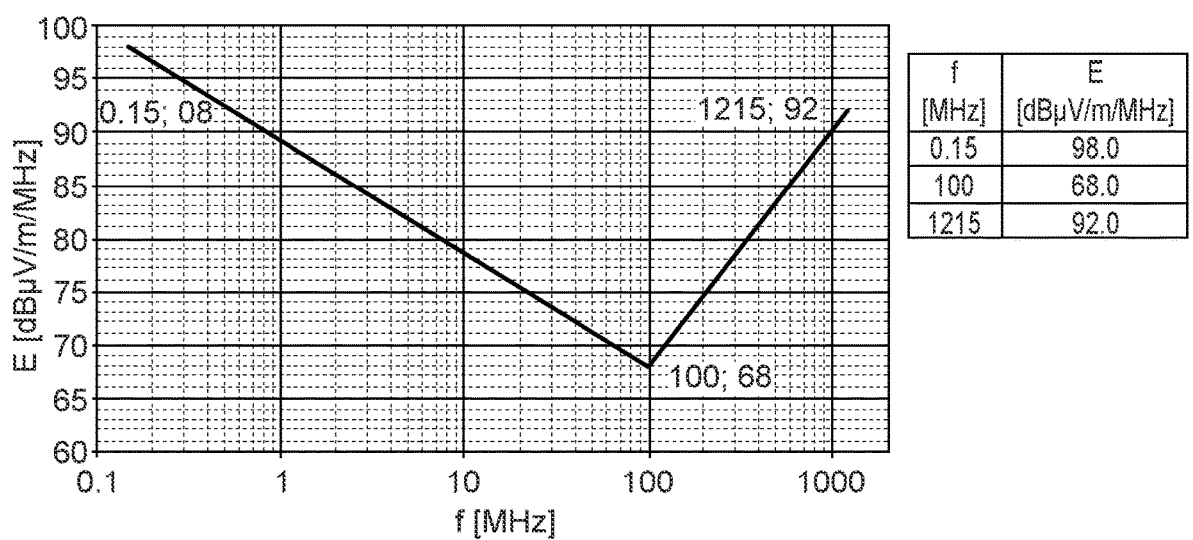
FIG. 4 shows an example of radiated emission limits for broadband emissions on aircraft.
Figure 5:
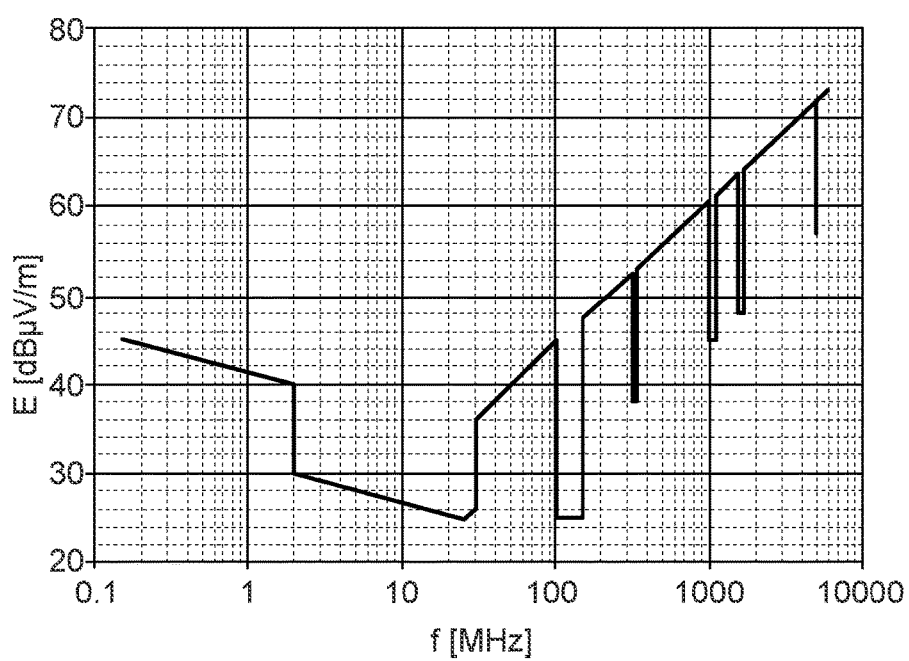
FIG. 5 shows an example of radiated emission limits for narrowband emissions on aircraft.
Figure 6:
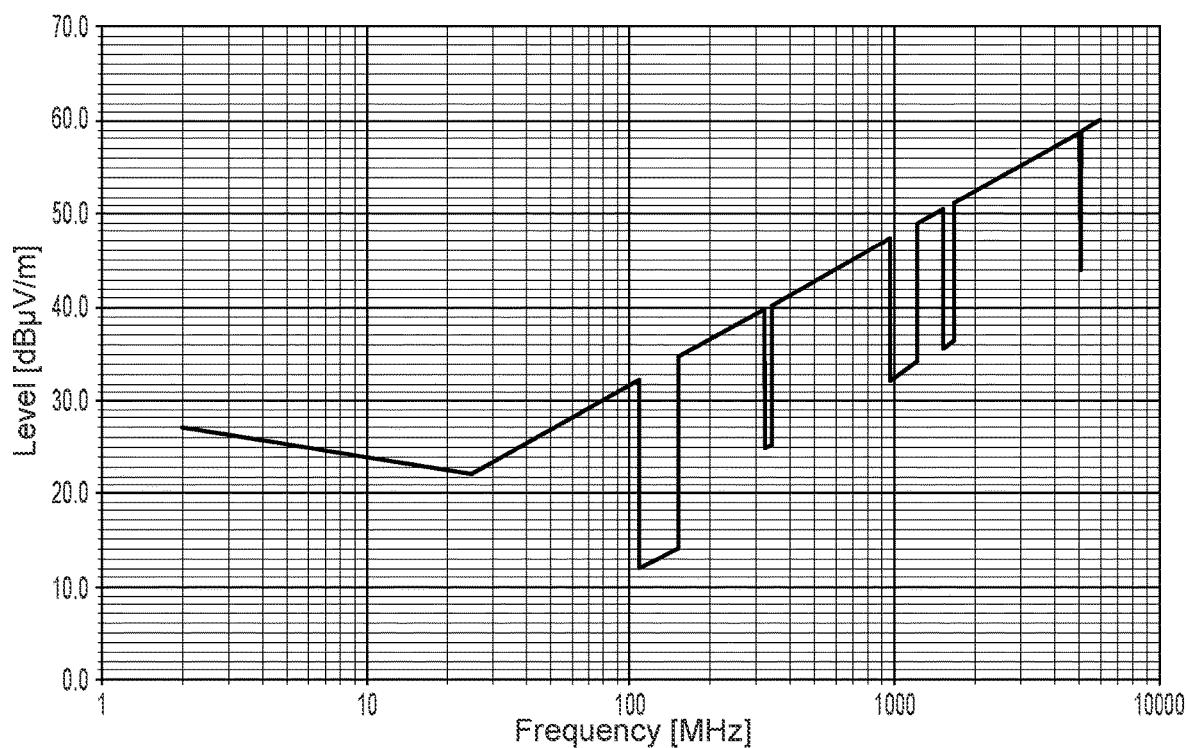
FIG. 6 shows another example of radiate emission limits for aircraft inserts.

The surface filter 305 can be configured pass one or more predetermined communication frequencies while filtering the one or more predetermined frequencies to aircraft device emissions limits (e.g., as shown in FIGS. 4-6). Examiner emissions limits are shown in FIGS. 4-6. Any suitable frequencies for filtering (e.g., to be under predetermined magnitude limits for aircraft standards) are contemplated herein.

In accordance with at least one aspect of this disclosure, an aircraft insert can include any suitable embodiment of a filter component for the aircraft insert disclosed herein, e.g., as component 300 described above. In certain embodiments, the aircraft insert can be an oven configured to communicate wirelessly over an aircraft network. Any other suitable aircraft appliance is contemplated herein.

In designing aircraft inserts with antennas, because all inserts are designed to be EMF shielded, it is difficult to put an antenna within the insert without blocking signals from getting to the antenna. Embodiments allow for placing an antenna where it is outside of an EMF shield of the insert, but also without affecting the aesthetics and exposure of the antenna components.

Embodiments can include an antenna that can be hidden behind a plastic component, e.g., printed on the inside surface. Embodiments can have a connector extending from a face for connecting the antenna to a cable for example.

Embodiments can be applied to any aircraft insert or plastic component thereof, for example, e.g., any suitable front plastic panel of an insert (e.g., replaceable or otherwise). For example, the antenna can be integrated into a door of the aircraft insert. Embodiments can be combined with EMI shielding features, also reducing the undesired emissions of the insert. Embodiments can include integrated or hidden LEDs or other indicators for indicating the status of a wireless connection.

Embodiments can include printed electronics to create an RF shield to block specific frequencies, for example. Certain embodiments can be configured to block about 200 MHz to about 300 MHz. As appreciated by those having ordinary skill in the art, the shorter the wavelength, the better it passes through a mesh of given size. Thus to work well at short wavelengths (i.e., high frequencies), the holes in a faraday cage must be smaller than the wavelength or a fraction thereof (e.g., a fourth) of the incident wave. Any suitable hole size or pattern is contemplated herein.

Embodiments can utilize in-mold or printed electronics to integrate an antenna into insert plastic parts, for example, in a removable faceplate/grill of an insert (e.g., an oven). This way it can be installed outside of the insert front but hidden from view. Embodiments can include traces on the inside of a plastic part. These traces can also be printed in the form of PCB antennas or EMI shields.

Embodiments can have an antenna on the absolute front of the insert, not being obstructed by any other component of the insert (such as an HMI). The antenna can cover an entire back side the front grill surface, allowing the maximum size possible, for example. Embodiments do not affect aesthetics, can be protected from outside tampering, and can improve functionality. Because of the large surface area, embodiments may allow for integrating multiple antennae, for example for different frequency ranges.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A filter component for an aircraft insert, comprising:
    a non-conductive body having an outer surface and an inner surface, wherein the inner surface is configured to be hidden from view when installed on the aircraft insert; and
    a surface filter disposed on the inner surface such that when the non-conductive body is installed on the aircraft insert, the surface filter is not visible, wherein the surface filter is configured to filter out one or more predetermined filter frequencies, wherein the non-conductive body is a faceplate for an aircraft appliance, wherein the non-conductive body defines a grill and a window for viewing an electronic display.

2. The filter component of claim 1, wherein the non-conductive body is plastic.

3. The filter component of claim 1, wherein the surface filter includes a conductive trace filter disposed on the inner surface of the non-conductive body and configured to act as frequency filter for the one or more predetermined filter frequencies.

4. The filter component of claim 3, wherein the conductive trace filter covers a portion of the grill to define an uncovered portion to pass one or more communication frequencies.

5. The filter component of claim 3, wherein the conductive trace filter is formed to conform with one or more inner surface shapes.

6. The filter component of claim 3, wherein the conductive trace filter defines a cage or grid shape to act as a faraday cage.

7. The filter component of claim 6, wherein gaps in the cage or grid shape are sized to filter frequencies having wavelengths larger than the gaps.

8. The filter component of claim 1, wherein the surface filter is configured to pass one or more predetermined communication frequencies while filtering the one or more predetermined frequencies to aircraft device emissions limits.

9. An aircraft insert, comprising:
    a filter component for the aircraft insert, comprising:
        a non-conductive body having an outer surface and an inner surface, wherein the inner surface is configured to be hidden from view when installed on the aircraft insert; and
        a surface filter disposed on the inner surface such that when the non-conductive body is installed on the aircraft insert, the surface filter is not visible, wherein the surface filter is configured to filter out one or more predetermined filter frequencies, wherein the non-conductive body is a faceplate for an aircraft appliance, wherein the non-conductive body defines a grill and a window for viewing an electronic display.

10. The aircraft insert of claim 9, wherein the non-conductive body is plastic.

11. The aircraft insert of claim 9, wherein the surface filter includes a conductive trace filter disposed on the inner surface of the non-conductive body and configured to act as a frequency filter for the one or more predetermined filter frequencies.

12. The aircraft insert of claim 11, wherein the conductive trace filter covers a portion of the grill to define an uncovered portion to pass one or more communication frequencies.

13. The aircraft insert of claim 11, wherein the conductive trace filter is formed to conform with one or more inner surface shapes.

14. The aircraft insert of claim 11, wherein the conductive trace filter defines a cage or grid shape to act as a faraday cage.

15. The aircraft insert of claim 9, wherein the surface filter is configured to pass one or more predetermined communication frequencies while filtering the one or more predetermined frequencies to aircraft device emissions limits.

16. The aircraft insert of claim 15, wherein the aircraft insert is an oven configured to communicate wirelessly over an aircraft network.

17. A filter component for an aircraft interior appliance, comprising:
    a non-conductive body having an outer surface and an inner surface, wherein the inner surface is configured to be hidden from view when installed on the aircraft interior appliance; and
    a surface filter disposed on the inner surface such that when the non-conductive body is installed on the aircraft interior appliance, the surface filter is not visible, wherein the surface filter is configured to filter out one or more predetermined filter frequencies, wherein the non-conductive body is a faceplate for the aircraft interior appliance.

* * * * *